YARN CLAMPING AND SEVERING MECHANISM FOR KNITTING MACHINES

Original Filed Feb. 27, 1957 4 Sheets-Sheet 1

INVENTORS.
Vernon T. Stack &
BY Edward E. Knox,
Paul & Paul
ATTORNEYS.

YARN CLAMPING AND SEVERING MECHANISM FOR KNITTING MACHINES

Original Filed Feb. 27, 1957 4 Sheets-Sheet 2

INVENTORS.
Vernon T. Stack &
BY Edward E. Knox,
Paul & Paul
ATTORNEYS.

YARN CLAMPING AND SEVERING MECHANISM FOR KNITTING MACHINES

Original Filed Feb. 27, 1957 4 Sheets-Sheet 3

INVENTORS.
Vernon T. Stack &
BY Edward E. Knox,
Paul & Paul
ATTORNEYS.

YARN CLAMPING AND SEVERING MECHANISM FOR KNITTING MACHINES

Original Filed Feb. 27, 1957 4 Sheets-Sheet 4

INVENTORS.
Vernon T. Stack &
BY Edward E. Knox,
Paul & Paul
ATTORNEYS.

United States Patent Office

Re. 25,584
Reissued May 26, 1964

25,584

YARN CLAMPING AND SEVERING MECHANISM FOR KNITTING MACHINES

Vernon T. Stack, Winston-Salem, and Edward E. Knox, Kernersville, N.C., by The Gordon Company, Winston-Salem, N.C., a partnership, assignee by mesne assignments Original No. 2,824,436, dated Feb. 25, 1958, Ser. No. 642,705, Feb. 27, 1957. Application for reissue Oct. 31, 1963, Ser. No. 321,390
7 Claims. (Cl. 66—140)

Matter enclosed in heavy brackets [ ] appears in the original patent but forms no part of this reissue specification; matter printed in italics indicates the additions made by reissue.

This invention relates to yarn clamping and severing mechanism for knitting machines. More particularly, it is concerned with mechanism useful in connection with circular hosiery knitting machines for severing the trailing ends of the yarns as they are introduced into or withdrawn from the knitting, and for clampingly holding the yarns from reeving back through the feeds after the feeds are withdrawn.

With such mechanism as ordinarily constructed, long trailing ends of the yarn are left in the hosiery which ends must be individually removed from the stockings after they are dropped from the knitting machine. This additional step adds considerably to the cost of producing the stockings.

The chief aim of our invention is to overcome the above mentioned drawbacks. This objective is realized in practice, as hereinafter more fully disclosed, through provision of a simple and reliable automatic mechanism whereby the yarns are severed close to the needles of the machines as the stockings are knitted, incident to both insertion and withdrawal of the yarn feeds so that but relatively short negligible ends thereof are left at the insides of the stockings; and whereby the yarns, upon being cut and withdrawn, are received and releasably held in readiness, for re-insertion into the knitting.

Other objects and attendant advantages will appear from the following detailed description of the attached drawings, wherein.

Figure 1:
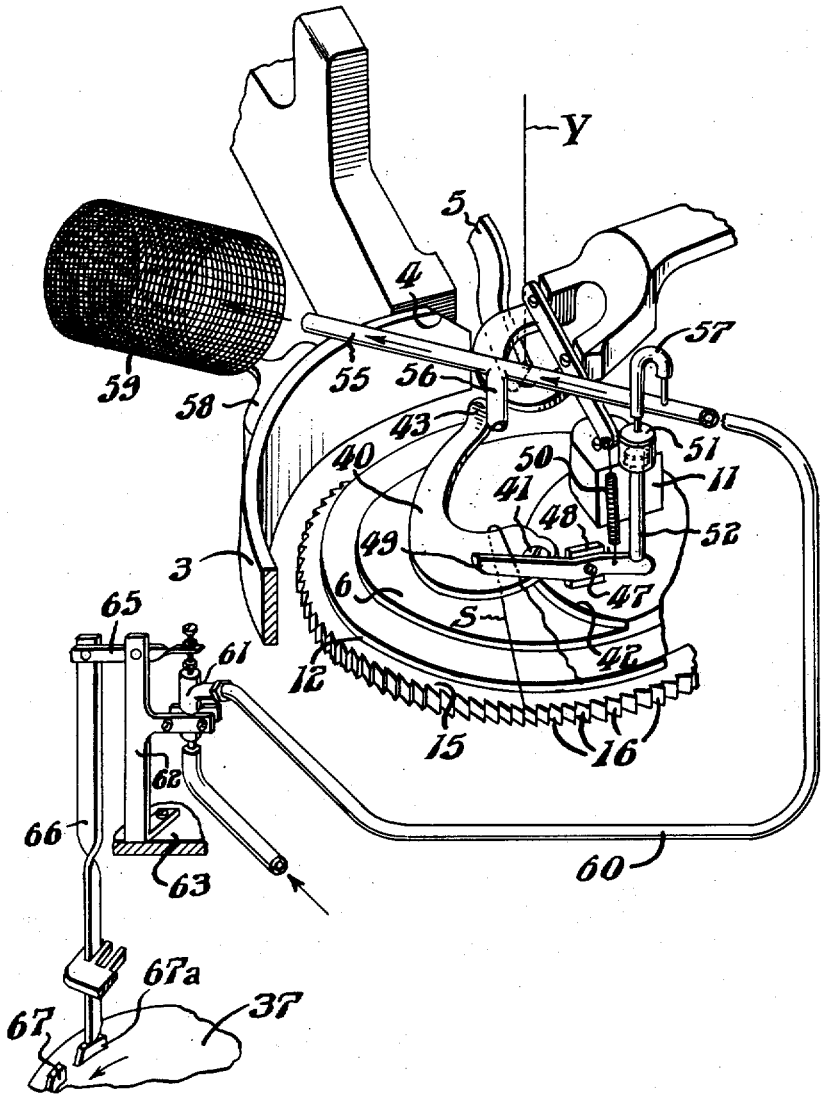
FIG. 1 is a fragmentary and more or less diagrammatic view in perspective of a portion of a circular stocking knitting machine conveniently embodying the yarn clamping and severing mechanism of our invention.

The knitting machine herein partly illustrated for the exemplification of our invention is generally of the construction disclosed in U.S. Patent 1,282,958 granted to R. W. Scott on October 29, 1918, having a rotary cylinder which is indicated by the dash and dot circle 1 in FIG. 3, with a complement of latch needles such as designated by the numeral 2 in FIG. 2; a latch guard ring 3 with a gap 4 therein at which an upwardly and outwardly retractable yarn feed finger 5 is located; and a welting mechanism whereof the cap plate [12] *6* is stationarily supported within the circle of the needles at the top of the cylinder by an overreaching bracket arm 7. The welting mechanism comprises a series of transfer instrumentalities 8 (FIGS. 2 and 4) slidable in radial guide grooves of an underlying dial plate 9 which is rotated in unison with the needle cylinder in the direction of the arrow in FIG. 2, said dial plate being secured to the lower end of a vertical shaft 10 which extends upwardly through a bearing boss 11 on the disk 6 to a drive means (not illustrated) therefor. The outside circumferential cam 12 for retracting the transfer bits 8 is affixed, as usual, to the bottom face of the disk 6 as shown in FIG. 4.

Figure 4:
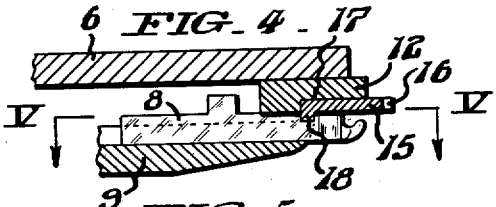
FIG. 4 is a fragmentary detail section taken as indicated by the angled arrows IV—IV in FIG. 3.
Figure 5:
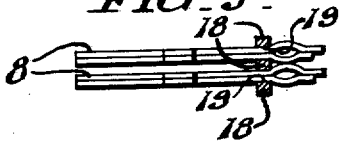
FIG. 5 is a fragmentary detail view in horizontal section taken as indicated by the angled arrows V—V in FIG. 4.

The improved yarn clamping and severing mechanism of our present invention includes an annulus 15 having sharp-edged ratchet-like peripheral teeth 16 pitched in the direction of cylinder rotation. As shown in FIG. 4, the underside of the cam 12 is circumferentially undercut as at 17 to receive the annulus 15, and said annulus is provided, at its inner periphery, with a pendent lug 18 which is notched, as at 19 in FIG. 5, for passage through it of a few of the transfer bits 8. As a result of this construction, the annulus 15 is caused to rotate in unison with the dial plate 9 and hence with the needle cylinder 1.

Figure 6:
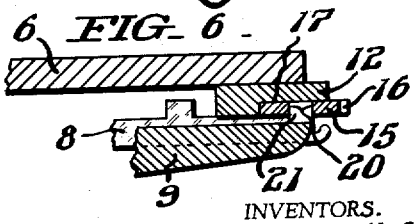
FIG. 6 is a detail view similar to FIG. 4 showing a modification.
Figure 7:
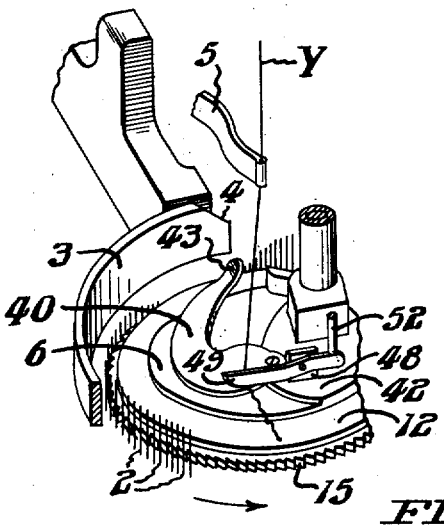
FIGS. 7, 8 and 9 are perspective views similar to FIG. 1, showing successive stages in the control of the yarn prior to being severed upon insertion of the yarn feed.

In the modification of FIG. 6, the annulus 15 is provided with a few slots 20 for engagement by upward projections 21 on the transfer dial 9 to insure its rotation with the dial plate 9 and the needle cylinder 1.

Mounted on a slightly raised embossment 42 on disk 6 adjacent the circumferential edge thereof at a point approximately 180 degrees from or substantially diametrically opposite the feed finger 5 is a small bracket 25 having a vertical bore in which is slidingly constrained, a stem 26 whereto is affixed, at the bottom end, a cutting element 27 arranged to cooperate with the teeth of the annulus 15 in severing the knitting yarn Y in a manner hereinafter explained. As shown, the element 27 is in the form of a finger whereof the distal end has an edge 28 which overlies the teeth 16 of the annulus 15 and which is sharpened to shear with said teeth. A spring 29 (FIG. 2) in the upper part of the bore in the bracket 25 serves to urge the cutter element 27 downward into shearing relation to the annulus 15 during yarn severance. Normally, the element 27 is raised clear of the annulus by a finger 30 which underreaches a lateral projection 31 on the stem 26, said finger being affixed to one end of a rock shaft 32 borne crosswise in the bracket 7 previously mentioned. An arm 33 affixed to the opposite end of the shaft 32 in turn underreaches a lever 34 which is arranged to be actuated, through the medium of a thrust rod 35 (FIG. 2), by spaced cam rises 36 and 36a on the usual intermittently rotated pattern drum 37 of the knitting machine. A relatively heavy spring 38, connected at one end to the arm 33 and at the other end to a fixed anchorage 39 on the bracket 7, is relied upon to keep the cutter element 27 normally elevated from the annulus 15.

The mechanism of our invention further comprises an arcuate yarn restraining element 40 which is fashioned from thin sheet metal and which, at one end, is secured by a screw 41 to the slightly raised embossment 42 of the disk 6 in the interval between the yarn feed 5 and the cutter element 27 so as to overhang the main surface of said disk. As shown, the restraining element 40 has a terminal tongue 43 which is curved upwardly toward the yarn feed. Medially fulcrumed at 47 to an upstanding lug 48 on the embossment 42 of the disk 6, see FIGS. 1 and 3, is a clamp element 49 by which the yarn is held upon being severed, said clamp element being urged downward upon the base portion of the restraining element 40 by the spring indicated at 50. *The purpose of*

*clamp element 49 is to securely clamp the ends of the inactive yarns extending from yarn feeding finger 5 and the other, usual yarn feeding fingers (not shown).* For actuating the clamp element 49, [I] *we* have provided a small pneumatic cylinder 51 of which the piston rod 52 bears upon the tail end of said element.

[To remove] *Removal of* the trailing segment S of yarn (FIG. 1) from the machine after severance upon insertion of the feed finger 5 [as also hereinafter more fully explained,] *comprises no part of this invention. A number of methods or devices well known in the art may be utilized, if desired. For example, the segment S may be removed manually, as disclosed in U.S. Patent No. 794,407. Alternatively, segment S may be removed by an air suction device such as that disclosed by U.S. Patent No. 3,006,173, or by an air suction device in cooperation with an auxiliary clamp, as disclosed in U.S. Patent No. 3,055,199. To suggest the application of such air suction devices to remove segment S* we have [further] provided an air tube 55 which is fixedly supported horizontally at an elevation above the disk 6, said tube having an open-ended pendent suction branch 56 that terminates adjacent the [inner edge of the] base portion of the restraining element 40. [and] *Only the upper portion of the branch 56 has been shown in FIG. 1. There is also shown in FIG. 1* a separate pendent pressure branch connection 57 with a cylinder 51 of which the piston rod bears upon the tail of the clamp element 49. Supported in alignment with the tube 55 by a bracket 58 on the latch guard ring 3, is a basket 59 for receiving the yarn segments severed upon insertion of the yarn feeding finger 5. The tube 55 (see FIG. 1) is in communication with a supply source of compressed air (not illustrated) by way of a flexible hose 60 wherein is interposed a control valve 61 which is suitably supported by a bracket 62 on a part 63 of the knitting machine frame. The valve 61 is arranged to be actuated, through a lever 65 medially fulcrumed on the bracket 62 and a thrust rod 66, by other spaced cam rises 67 and 67a on the pattern drum 37 of the machine.

OPERATION

Figure 2:
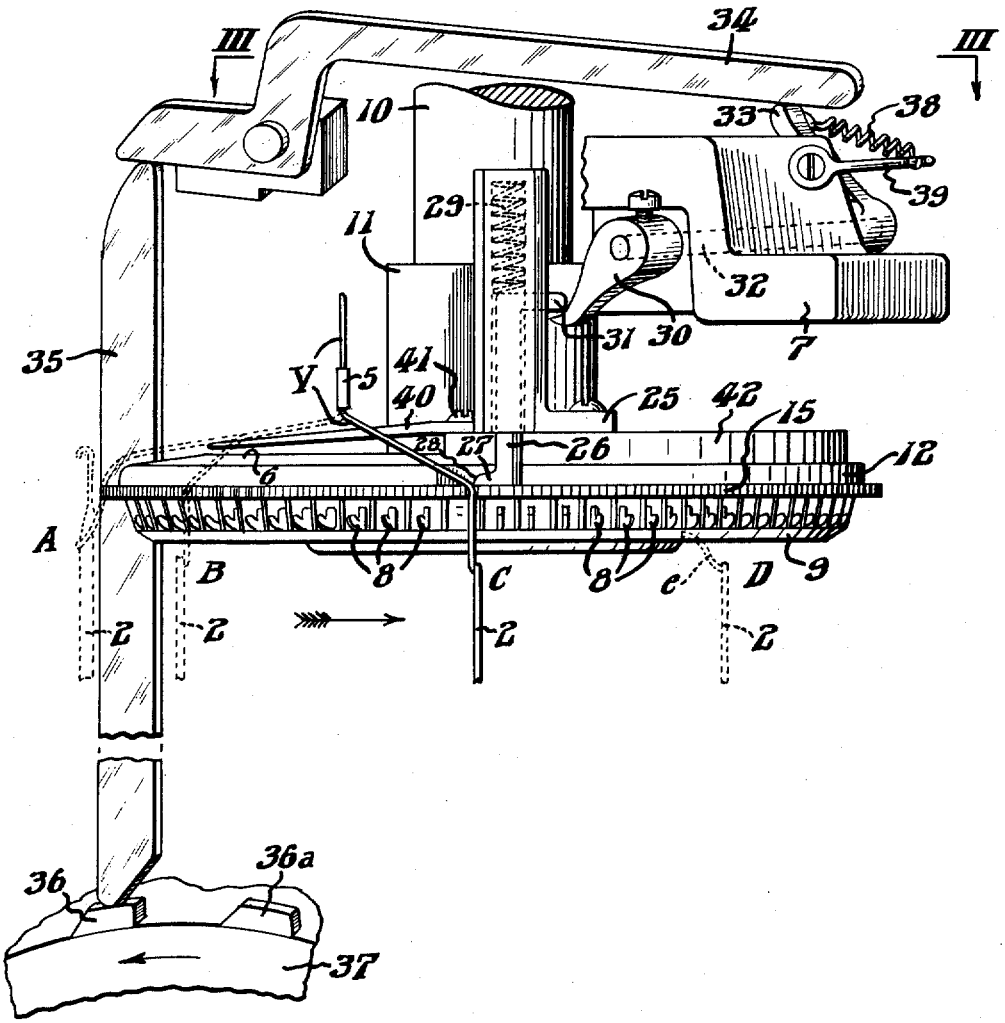
FIG. 2 is a fragmentary elevational view of the machine.
Figure 3:
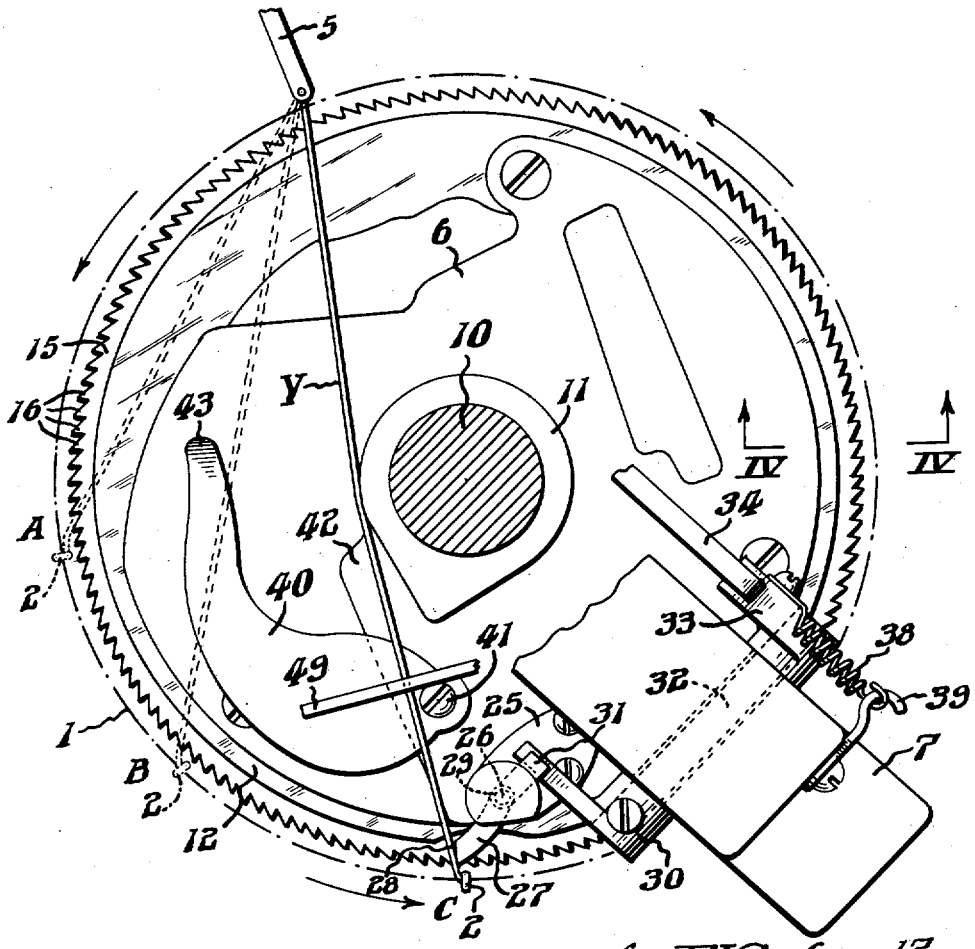
FIG. 3 is a horizontal section taken as indicated by the angled arrows III—III in FIG. 2 and showing how the yarn is controlled and severed upon withdrawal of the yarn feed.

As the feeding finger 5 is retracted, the yarn Y is drawn down by the last needle 2 fed and is caught between a pair of adjacent teeth of the annulus 15 as shown in dotted lines at A in FIG. 3. By continued rotation of the cylinder 1, the yarn Y is dragged about as the needle advances through the dotted line position B to the full line position C in FIG. 3, to overpass the restraining element 40 and to slide under the clamp element 49. Concurrently with this action, the thrust rod 35 is lifted as the cam rise 36 on the drum 37 passes beneath it as shown in FIG. 2, the lever 34 being thereby actuated and the finger 30 moved counterclockwise against the action of the spring 38 and the cutter element 27 is released and depressed by its spring 29 into engagement with the annulus 15. Consequently, as the needle reaches the position C in FIG. 3, the yarn is severed by shearing of the cutter element 27 with the teeth of the annulus 15 between which the yarn is engaged. The yarn is thus cut close to the last needle to which it is fed upon retraction of the feed finger with but a short end e projecting from such needle as at D in FIG. 2. Upon impartation of a subsequent rotative shog to the drum 37 and movement of the cam 36 from beneath the thrust rod 35, the cutter element 27 is raised by lift of the finger 30 under the influence of the spring 38.

Figure 8:
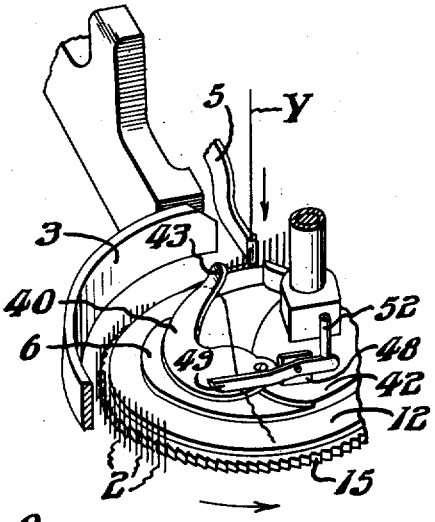
Figure 9:
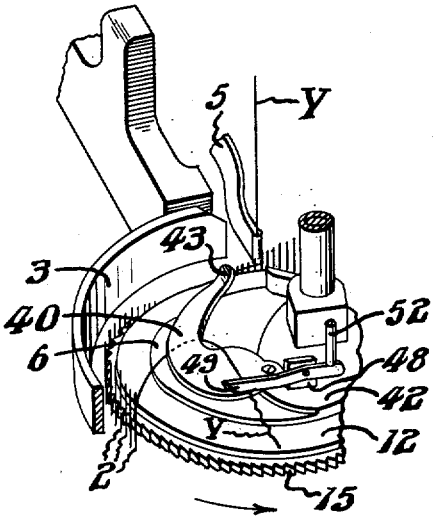

Upon re-insertion of the feed finger 5, the yarn Y is drawn down by the first needle to which it is served and, as during retraction, is incidentally caught between adjacent teeth of the annulus 15. By continued rotation of the needle cylinder 1, the yarn is dragged, this time, beneath the restraining element 40 and over top of the disk 6 as shown in FIG. 8 while held by the clamp 49, and as the needle approaches the yarn severing station, said yarn is gradually formed into a loop about said restraining element as shown in FIGS. 9 and 1. Prior to arrival of the first needle fed at the severing station, the cam drum 37 is given another rotary shift to bring the cam rise 36a beneath the thrust rod 35 for release of the cutter element 27 into engagement with the annulus 15 in exactly the same manner as above described in connection with yarn retraction.

After severance of the yarn, the cam drum 37 is given another rotary shift whereby cam rise 36a is moved from beneath the thrust rod 35 to raise the cutter element 27 from engagement with the annulus 15. By a subsequent rotary shift of cam drum 37, the cam rise 67a is brought beneath thrust rod 66, with consequent admission of compressed air into the tube 55 by the opening of the valve 61. This compressed air causes the depression of the piston rod of the cylinder 51 and lifting of the clamp element 49 against the pull of the spring 50. Concurrently with this action, the suction created in pendent branch 56, caused by the discharge of air through tube 55, causes the remaining loop segment S to be picked up by this suction and to be eventually blown from the open terminal end of tube 55 into the receiver 59. By a subsequent rotative shog of the drum 37 and movement of cam 67a from beneath the thrust rod 66 the valve 61 is closed to shut off the compressed air [and] *to* the cylinder 51 to allow the clamp 49 to be depressed by the spring 50 to its normal clamping position in engagement with the top surface of the restraining element 40.

Knitting machines of the type herein referred to usually have several feed fingers for as many individual yarns, and it is to be understood that, in accordance with our invention, the drum 37 is provided, in practice, with as many additional cam rises as may be required to effect severance of the yarn, as the different feed fingers are withdrawn or re-inserted in the same manner as hereinbefore described in connection with the single feed finger 5 shown in the drawings.

It is to be further understood that we do not consider ourselves limited to the precise details of construction and arrangement shown in the drawings by way of example since they are capable of considerable modification as will be readily understood by those schooled in the knitting art.

Having thus described our invention, we claim:

1. Yarn clamping and severing mechanism for a circular knitting machine having a rotating cylinder with a complement of needles, a stationarily-supported retractable yarn feed, and a stationary disk axially within the needle circle at the top of the needle cylinder, said mechanism including an annulus at the bottom of the disk capable of rotation with the cylinder, said annulus having sharp edged peripheral teeth extending into close proximity to the needles; a cooperative cutter element positioned substantially diametrically opposite the feed, and adapted to bear downwardly upon and shear with the teeth of the annulus; and a clamp positioned in the interval between the feed and the cutter element whereby, upon retraction of the feed, the yarn is carried down by the last needle to which it is fed and incidentally caught between adjacent teeth of the annulus, drawn beneath the clamp, and eventually severed close to the needle by shearing action of the cutter element with said teeth as said needle passes said cutter element.

2. Yarn clamping and severing mechanism according to claim 1, including means for yieldingly urging the cooperative cutter element into shearing engagement with the toothed annulus; means for normally holding the cutter element raised clear of the annulus; and means for actuating the holding means for release of the cutter element into activity in readiness to sever the yarn just before the needle last fed upon retraction of the feed or the first needle fed upon feed insertion arrives at said cutter element.

3. Yarn clamping and severing mechanism, according to claim 2, for a circular knitting machine having a cam drum, and wherein the means for normally holding the cooperative cutter element in inoperative position includes a lift finger, and wherein the means by which the lift finger is actuated to release the cutter element into activity comprises a cam rise on the cam drum and interposed instrumentalities connected to said lift finger.

[4. Yarn clamping and severing mechanism, according to claim 1, wherein the clamp is normally held closed by spring means; and further including means for actuating the clamp in opposition to the spring means, comprising a pressure fluid cylinder with its piston connected to the clamp; a normally open valve, and means for closing the valve to interrupt flow of pressure fluid to said cylinder to open the clamp as the last needle fed, during insertion of the yarn feed, approaches said cutter element.]

5. Yarn clamping and severing mechanism for a circular knitting machine having a rotating cylinder with a complement of needles, a stationarily-supported retractable yarn feed; a stationary disk axially within the needle circle at the top of the cylinder, and a radially grooved dial plate for sliding transfer bits rotated in unison with the cylinder, said mechanism including [an] *a toothed* annulus [at the bottom of] *disposed above* the dial plate capable of rotation with the cylinder; a cooperative cutter element supported adjacent the periphery of the disk substantially diametrically opposite the feed and adapted to bear downwardly upon and shear with the teeth of the annulus; and a clamp positioned in the interval between the feed and the cutter element whereby, upon retraction of the feed, the yarn is carried down by the last needle to which it is fed and incidentally caught between adjacent teeth of the annulus, drawn beneath the clamp, and eventually severed close to the needle as said needle passes said cutter element.

6. Yarn clamping and severing mechanism according to claim 5, wherein the toothed annulus is provided at its inner periphery with a pendent projection notched for passage of some of the transfer bits and thereby caused to rotate with the dial.

7. Yarn clamping and severing mechanism, according to claim 5, wherein the toothed annulus is provided with a radial slit; and wherein the dial has an upstanding projection adjacent the periphery of the dial engaged in the slit of the toothed annulus which is thereby caused to rotate with said dial.

8. Yarn clamping and severing mechanism for a circular knitting machine having a rotating cylinder with a complement of needles, a stationarily-supported upwardly retractable yarn feed and a stationary disk axially within the needle circle at the top of the needle cylinder, sai mechanism including an annulus at the bottom of the di capable of rotation with the cylinder, said annulus havi sharp edge peripheral teeth in close proximity to t needles; a cooperative cutter element supported adjace the periphery of the disk substantially diametrically o posite the feed, and adapted to bear downwardly up and shear with the teeth of the annulus; and a clan supported in the interval between the feed and the cutt element by which the yarn is held while the feed is tracted; and a yarn restraining element supported, wi intervening clearance therebeneath, on the disk betwe the feed and the clamp over which restraining eleme the yarn extends while the feed is retracted, wherel upon insertion of the feed, the yarn is carried down the first needle to which it is fed and incidentally cau between adjacent teeth of the annulus, the trailing e thereof drawn beneath and looped about the restrain element, and the yarn eventually severed close to needle as said needle passes said cutter element.

[9. Yarn severing and clamping mechanism acco ing to claim 8, further including means for actuating clamp after the severance to release the severed yarn s ment looped about the restraining element; and me for removing the severed segment from the restraining ment upon release from the clamp.]

[10. Yarn clamping and severing mechanism, acco ing to claim 9, wherein the means for removing severed segment of the yarn comprises a tube in c munication with a source of compressed air and hav a suction branch which reaches to the bend of the seve yarn segment looped about the restraining element, tube being open at its terminal end; and further inclu a fixedly supported reticulate receiver into which the y segment, drawn through the suction branch into the t is discharged.]

References Cited in the file of this patent or the original patent

UNITED STATES PATENTS

| | | |
|---|---|---|
| 1,727,783 | Pulster | Sept. 10, 1 |
| 1,945,971 | Gagne | Feb. 6, 1 |
| 2,089,904 | Lawson et al. | Aug. 10, 1 |
| 2,560,484 | Schoenster et al. | July 10, 1 |
| 2,713,254 | Minton | July 19, 1 |
| 2,810,280 | Rossman | Oct. 22, 1 |
| 2,952,148 | Rather | Sept. 13, 1 |
| 3,006,173 | Shoaf | Oct. 13, |
| 3,055,199 | Stack | Sept. 25, |